United States Patent [19]

Galasso et al.

[11] 3,865,917
[45] Feb. 11, 1975

[54] PREPARATION OF ALUMINA MONOFILAMENTS

[75] Inventors: Francis S. Galasso, Manchester; Romeo G. Bourdeau, Wapping, both of Conn.

[73] Assignee: United Aircraft Corporation, East Hartford, Conn.

[22] Filed: Dec. 20, 1973

[21] Appl. No.: 427,001

Related U.S. Application Data

[63] Continuation of Ser. No. 225,298, Feb. 10, 1972, abandoned, which is a continuation-in-part of Ser. No. 67,606, Aug. 27, 1970, abandoned.

[52] U.S. Cl............ 264/183, 106/65, 264/DIG. 19, 264/56, 264/63
[51] Int. Cl. ............................................. D01f 9/00
[58] Field of Search ...... 264/183, DIG. 19, 63, 178, 264/176, 203; 106/65

[56] References Cited
UNITED STATES PATENTS

| 3,108,888 | 10/1963 | Bugosh | 106/62 |
| 3,270,109 | 8/1966 | Kelsey | 264/178 |
| 3,503,765 | 3/1970 | Blaze | 106/65 |
| 3,560,408 | 2/1971 | Kiehl et al. | 264/178 |
| 3,632,709 | 1/1972 | Hayes et al. | 264/63 |
| 3,652,749 | 3/1972 | Sobel et al. | 264/63 |
| 3,795,524 | 3/1974 | Sowman | 264/63 |

*Primary Examiner*—Donald J. Arnold
*Attorney, Agent, or Firm*—John D. Del Ponti

[57] ABSTRACT

A process for preparing continuous aluminum salt filaments convertible to transparent alumina filaments wherein an aqueous fiber-forming solution of hydrated monochloro aluminum hydroxide is concentrated to 1,500–3,000 centipoises and formed into filaments by extrusion directly into a coagulating bath comprising a liquid selected from the group consisting of isopropyl alcohol, ethyl alcohol, tertiary butyl alcohol, a mixture of ethyl alcohol and acetone and a mixture of isopropyl alcohol and acetone.

2 Claims, No Drawings

PREPARATION OF ALUMINA MONOFILAMENTS

This is a continuation of application Ser. No. 225,298, filed Feb. 10, 1972 which is a continuation-in-part of application Ser. No. 67,606, filed Aug. 27, 1970 and both now abandoned.

BACKGROUND OF THE INVENTION

Various techniques are known for producing solid inorganic oxide filamentary products from a diversity of starting materials. At present, much attention is being focused on the production of continuous monofilaments of inorganic oxides such as alumina for use as a structural reinforcing material. The prior art has indicated that inorganic oxide monofilaments may be prepared from gels wherein there is present, as an essential ingredient, the metal salt of an organic acid. See, for example, U.S. Pat. Nos. 3,207,109 and 3,311,689 to Kelsey and U.S. Pat. No. 3,082,099 to Beasley et al.

It has now been found that by employing as a fiber-forming composition an inorganic gel having a particular viscosity in combination with a preselected coagulating bath, superior filaments of alumina may be produced.

SUMMARY OF THE INVENTION

This invention relates to a method for producing aluminum salt filaments convertible to alumina monofilaments and yarn and more particularly relates to a process for producing continuous aluminum chloride filaments convertible by calcining to transparent gamma or alpha alumina filaments by a wet spinning technique.

The present invention contemplates the employment of a starting solution of hydrated monohalo aluminum hydroxide, wherein the Al/halide ratio is high and preferably within the range of 2 to 3. The starting solution is brought to a viscosity of 1,500–3,000 centipoises and extruded through an orifice directly into an alcohol base coagulating bath.

DESCRIPTION OF THE PREFERRED EMBODIMENTS

In the practice of the present invention, it has been found that satisfactory filaments may be produced when the fiber-forming solution is an aqueous aluminum salt solution, suitably containing 40%–50% water and preferably containing 42%–45% water, having a viscosity of 1,500–3,000 centipoises, but preferably of 2,000–3,000 centipoises, but preferably of 2,000–3,000 centipoises, and an Al/halide ratio of 2 to 3. The aluminum is supplied to the fiber-forming composition in the form of a hydrated monohalo aluminum hydroxide.

In one investigation, the aluminum salt of hydrochloric acid was utilized to provide an aluminum chlorohydroxide complex starting material having the general formula $Al_2(OH)_5Cl$. It should be noted that the same complex is commercially available under the brand name Chlorhydrol from the Reheis Chemical Company. The commercially produced material contains 47% $Al_2O_3$ and is available either as a clear liquid containing 50% water or as a granular material. Whether the aluminum chlorohydroxide complex is prepared in the laboratory or obtained commercially, viscosity must be maintained within the range of 1,500–3,000 centipoises. Viscosity is critical. It was found that very fluid solutions, i.e., those below 1,500 centipoises, do not fiberize while solutions with viscosities greater than 3,000 centipoises are not readily extrudable. It appears that at the higher viscosity solutions, the more will be the irregularity in filament diameter. For example, the variation in diameter along a spool of fiber 200 to 300 feet in length and extruded from a solution of 3,000 centipoises was 10% or greater. On the other hand, with a viscosity of 2,000 centipoises, the variation in diameter was on the order of 5%. It has been further observed that fibers drawn from solutions of relatively high viscosity, i.e., 3,500 centipoises and up, tend to break at isolated points on the take-up spool and/or exhibit structural variations after calcining.

Two basic approaches were investigated to form continuous fibers. In the first, a dry spinning technique was explored wherein the aluminum salt solution was squirted and dried in the atmosphere. The dry spinning process resulted in fibers less than one foot in length and was generally unsuccessful. The second approach, a wet spinning technique, forms the basis of the present invention. It involves the squirting of the aluminum salt solution from a small diameter spinneret hole directly into a coagulating or drying liquid bath of a particular composition.

While various liquids were investigated as coagulating baths, the alcohols proved most promising and of these, it was found that fibers could be drawn from ethyl, isopropyl and tert-butyl alcohols. Only large diameter filaments, from 1 to 2 mils, could be drawn from ethyl alcohol. However, it was found that with the addition of 40%–70% by weight, preferably 50%–60% by weight acetone, the drying power of the bath was increased and smaller filaments, down to 3 microns, could be produced.

In the practice of the invention, the aluminum salt solution was contained in a syringe which was activated by a Sage syringe pump. The syringe was connected to one end of a U-shaped tube which was immersed in the coagulating bath. By means of a variable speed motor, metered amounts of the solution were extruded from a small diameter orifice (spinneret) located at the other end of the U-tube. The extruded filament was wound up on a take-up spool located above the coagulating bath and U-tube. As the primary function of the coagulating bath appears to be the removal of water from the fiber-forming solution, a circulating pump was utilized to prevent concentrations of water around the drawing fiber. Surge tanks were used to reduce turbulence in the bath, a constant temperature coil was used in the bath system to maintain the bath at constant ambient temperature for unchanging drying conditions and a level wind mechanism was used to spool the fibers uniformly. Various spinneret hole sizes from 8 mils to 4 mils were investigated. With an 8 mil diameter spinneret, it was not possible to draw fibers much less than 1 mil in diameter while the 4 mil spinneret produced fibers less than 0.2 mil (5 microns) in diameter.

It was found in all cases that the filament diameter is reduced by either decreasing the solution feed rate or by increasing the fiber drawing speed. With a coagulating bath of ethyl alcohol and acetone, it was found that the filament diameter also decreased as the acetone concentration decreased from the optimum 50–60%. Although imperfectly understood at the present time, it is believed that the ethyl alcohol, which is soluble in the aluminum chlorohydroxide complex, acts at least partially as a solvent. At a 40% acetone concentration, the filaments were nodular with apparent depressions in the center of the modules. At a 70% acetone concentration, only large diameter filaments of crystalline structure could be drawn. Filaments drawn at a 50%–60% acetone concentration were transparent and significantly stronger than the crystalline or nodular fibers. The results of various experiments utilizing ethyl alcohol-acetone coagulating bath are given in the following table.

Table I

Aluminum Chlorohydride Filaments from Ethyl Alcohol — Acetone Mixtures
Diameter, mils

| Drawing Speed | Feed Rate | 70% Acet. | 60% Acet. | 50% Acet. | 40% Acet. |
|---|---|---|---|---|---|
| ft/hr | ml/hr | | | | |
| 750 | .05 | .52 | .45 | .3 | .22 (nodular) |
| do. | .04 | ↓ | .375 | .27 | .21 |
| do. | .03 | ↓ | .35 | .23 | .195 |
| do. | .02 | ↓ | .3 | .195 | ↓ |
| do. | .01 | No Draw | .225 | .18 | No Draw |
| 500 | .03 | | .41 | .2 | |
| 1000 | do. | | .27 | .18 | |
| 1500 | do. | | .255 | .14 | |
| 2000 | do. | | .23 | .13 | |
| 2500 | do. | | .195 | .12 | (3 microns) |
| 3000 | do. | | .187 | — | |

Filaments produced by drawing from isopropyl alcohol had diameters approximately equal to those drawn from the 60% acetone-40% ethyl alcohol mixture. In appearance, the filaments from both baths were identical except that fibers from the isopropyl bath were drier and evidenced no tendency to stick to the take-up spool. All drawn filaments were stable in air although they could be dissolved in water.

The following table illustrates the results of using an isopropyl alcohol bath.

Table II

Aluminum Chlorohydride Filaments from Isopropyl Alcohol

| Drawing Speed | Feed Rate | Diameter | Drawing Speed | Feed Rate | Diameter |
|---|---|---|---|---|---|
| ft/hr | ml/hr | mils | ft/hr | ml/hr | mils |
| 750 | .05 | .45 | 500 | .03 | .36 |
| do. | .04 | .40 | 1000 | do. | .26 |
| do. | .03 | .32 | 1500 | do. | .225 |
| do. | .02 | .30 | 2000 | do. | .21 |
| | | | 2500 | do. | .195 |

Filaments were also produced in isopropyl alcohol containing from 5%–25% acetone and the need to adjust the drying power vs the solvent power of the bath was further demonstrated. For a solution feed rate of .03 wt/hr and a drawing speed of 2,000 ft/hr the optimum acetone concentration in isopropyl alcohol is 15%.

During several experiments, the distance between the spinneret and the surface of the bath was varied from one-fourth to 6 inches. In general, the fiber diameter remained constant, indicating that the large reduction in diameter (4 mils to less than 0.2 mils) takes place close to the spinneret hole. However, as the distance was decreased from one-half inch to one-fourth inch, the fiber became increasingly nodular until it was completely so at the one-fourth inch distance.

Once the aluminum salt filaments are produced, they are subjected to a calcining operation and converted first to gamma, then to alpha alumina. The calcining process is critical in establishing the structure and properties of $Al_2O_3$ filaments. It has been found that in order to produce satisfactory clear, continuous defect-free gamma alumina fibers, the aluminum salt filaments must be heated to temperatures below 1,000° C according to various schedules. In one preferred calcining cycle, the filaments are heated relatively slowly in the presence of water vapor to approximately 850° C before being subjected to further temperature increase. Three heating schedules which have been found satisfactory in producing gamma alumina all employ an 8½ hour cycle wherein the filaments are heated, in the presence of water vapor, to 850°C as follows:

Heat from 25° to 350° C in 2 hours
Hold at 350° C for 1 hour
Heat from 350° to 450° C in 1 hour
Hold at 450° C for 1 hour
Heat from 450° to 850° C in 4½ hours
Hold at 850° C for 1 hour In one series of experiments, filaments cycled for 8½ hours as above-indicated were allowed to cool to room temperature and were then heated to 940° C in approximately 10 minutes and held at that temperature for 1 hour. The resulting gamma alumina filaments were transparent and stable and had an average tensile strength of 58,000 psi and Young's Modulus of $9.8 \times 10^6$ psi.

Another group of filaments cyled for 8½ hours as above-indicated were also allowed to cool to room temperature and were heated to 900° C in approximately 10 minutes and held there for 1 hour. These gamma alumina filaments were also transparent and stable and exhibited an average tensile strength of 78,000 psi and a Young's Modulus of $9.7 \times 10^6$ psi.

A third group of filaments was likewise cycled for 8½ hours, but rather than being cooled to room temperature thereafter, were then heated from 850° to 940° C in 3 hours. These filaments had an average tensile strength of 87,700 psi and Young's Modulus of $10.8 \times 10^6$ psi.

In order to produce clear continuous defect free alpha alumina filaments, the above transparent gamma alumina filaments are heated from room temperature to 1,200° C in approximately 10 minutes and held at that temperature for 1 hour. In the alternative, they may be heated from room temperature to 1,300° C in approximately 10 minutes and held at that temperature for approximately 10 minutes.

It should be noted that the spun filaments can be heated rapidly over a period of a few minutes (less than 15) from room temperature to high temperatures (700° to 1,000° C) without apparent degradation to also produce gamma-type aluminum oxide fibers. Experiments indicated that although the actual fiber temperatures could not be measured, a reduction in area of 50% and greater was obtained. The fibers remained transparent without any tendency to join or sinter together and they proved stable when immersed in water. The rapid calcining cycle produced gamma-type aluminum oxide filaments with average tensile strengths of 44,500 psi to 133,800 psi.

In general, heating to 200° C produces no change in clarity of the fiber but does reduce the diameter by approximately 5 to 10% depending on time at temperature.

What has been set forth above is intended primarily as exemplary to enable those skilled in the art in the practice of the invention and it should therefore be understood that, within the scope of the appended claims, the invention may be practiced in other ways than as specifically described.

What is claimed is:

1. A process for producing continuous aluminum chlorohydride filaments convertible by calcining to transparent gamma or alpha aluminum oxide filaments comprising:

providing an aqueous fiber-forming solution consisting essentially of 40–50 weight percent water, remainder an aluminum chlorohydroxide complex starting material having the formula $Al_2(OH)_5Cl$, said solution having a viscosity of 1,500–3,000 centipoises; and forming said viscous liquid into filaments by extruding it in a coagulating liquid consisting essentially of a liquid selected from the group consisting of isopropyl alcohol, ethyl alcohol, tertiary butyl alcohol, a mixture of ethyl alcohol and 40–70 weight percent acetone and a mixture of isopropyl alcohol and 5–25 weight percent acetone.

2. The process of claim 1 wherein said solution has 42–45 weight percent water and a viscosity of 2,000–3,000 centipoises.

* * * * *